United States Patent
Miura (10) Patent No.: US 12,449,979 B2
(45) Date of Patent: Oct. 21, 2025

(54) MEMORY SYSTEM

(71) Applicant: Kioxia Corporation, Tokyo (JP)

(72) Inventor: Takeshi Miura, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 311 days.

(21) Appl. No.: 18/172,562

(22) Filed: Feb. 22, 2023

(65) Prior Publication Data

US 2024/0094916 A1    Mar. 21, 2024

(30) Foreign Application Priority Data

Sep. 21, 2022    (JP) .................................. 2022-150394

(51) Int. Cl.
*G06F 3/06*    (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 10,818,328 B2 | 10/2020 | Kim et al. | |
| 11,036,412 B2 | 6/2021 | Khalili et al. | |
| 2013/0128675 A1* | 5/2013 | Kim | G11C 7/1063 365/189.011 |
| 2019/0087101 A1* | 3/2019 | Endo | G06F 3/0611 |
| 2020/0233613 A1* | 7/2020 | Tokiwa | G11C 16/32 |
| 2021/0208780 A1 | 7/2021 | Walker et al. | |
| 2023/0236963 A1 | 7/2023 | Miura | |

* cited by examiner

*Primary Examiner* — Eric Cardwell
(74) *Attorney, Agent, or Firm* — Foley & Lardner LLP (57) ABSTRACT

A memory system includes a nonvolatile memory including first and second planes each including a plurality of memory cells, and a memory controller configured to transmit commands to the first and second planes via a first signal line and receive data from the first and second planes via a second signal line. The memory controller is configured such that, when the first plane is executing a first process, the memory controller suspends transmission of a first command instructing reservation of the first process to the second plane until a first condition is satisfied.

18 Claims, 9 Drawing Sheets

| CASE | FOR COMPACTION PROCESS | FOR RANDOM READ PROCESS | |
|---|---|---|---|
| | | WHEN THROUGHPUT IS CONSIDERED IMPORTANT | WHEN LATENCY IS CONSIDERED IMPORTANT |
| PRIORITI -ZATION POLICY | IN ORDER OF GREATER LENGTH OF TOTAL TIME OF REMAINING READ SENSE PROCESS AND DATA OUT PROCESS | IN ORDER OF HIGHER NUMBER OF READ COMMANDS | IN ORDER OF ARRIVAL OF CHANNEL QUEUE |

MEMORY SYSTEM

CROSS-REFERENCE TO RELATED APPLICATION(S)

This application is based upon and claims the benefit of priority from Japanese Patent Application No. 2022-150394, filed Sep. 21, 2022, the entire contents of which are incorporated herein by reference.

FIELD

Embodiments described herein relate generally to a memory system.

BACKGROUND

A memory system is known, which includes a nonvolatile memory that stores data in a nonvolatile manner and a memory controller that controls the nonvolatile memory.

DETAILED DESCRIPTION

Embodiments provide improved data read efficiency.

In general, according to at least one embodiment, a memory system includes a nonvolatile memory including first and second planes each including a plurality of memory cells, and a memory controller configured to transmit commands to the first and second planes via a first signal line and receive data from the first and second planes via a second signal line. The memory controller is configured such that, when the first plane is executing a first process, the memory controller suspends transmission of a first command instructing reservation of the first process to the second plane until a first condition is satisfied.

Hereinafter, embodiments will be described with reference to the drawings. In the description, components having substantially the same functions and configurations are denoted by the same reference numerals. Further, the embodiments shown below are examples of technical ideas. The embodiment does not specify the material, shape, structure, arrangement, and the like of the components. Embodiments may be modified in various ways.

1. First Embodiment

1.1 Configuration 1.1.1 Information Processing System

The information processing system according to the first embodiment will be described.

Figure 1:
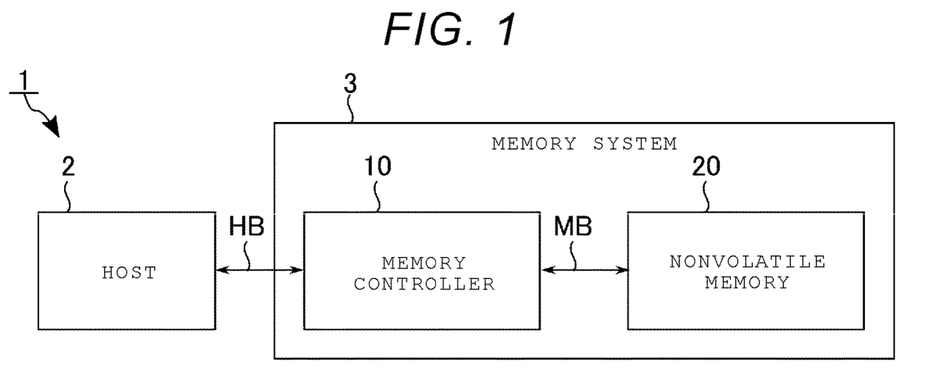
FIG. 1 is a block diagram showing an example of a configuration of an information processing system according to a first embodiment.

FIG. 1 is a block diagram showing a configuration of the information processing system according to the first embodiment. The information processing system 1 includes a host 2 and a memory system 3. The host 2 and the memory system 3 are connected to each other via a host bus HB.

The host 2 is an electronic device such as a personal computer, a mobile information terminal, a server, and the like.

The memory system 3 is a storage medium such as a memory card, a solid state drive (SSD), and the like.

The memory system 3 includes a memory controller 10 and a nonvolatile memory 20. The memory controller 10 and the nonvolatile memory 20 are connected to each other via a memory bus MB.

The memory controller 10 is an integrated circuit (IC) chip such as a system-on-a-chip (SoC). The memory controller 10 controls the nonvolatile memory 20 based on a received request.

For example, the nonvolatile memory 20 is a NAND flash memory. The nonvolatile memory 20 stores data in a nonvolatile manner.

1.1.2 Memory System

Figure 2:
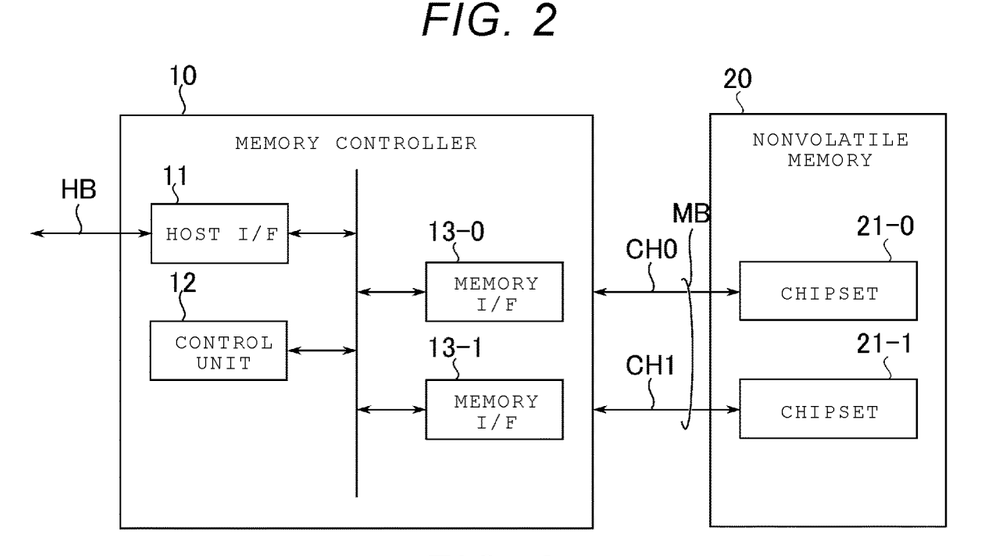
FIG. 2 is a block diagram showing an example of an internal configuration of a memory system according to the first embodiment.

Next, the internal configuration of the memory system 3 will be explained with reference to FIG. 2. FIG. 2 is a block diagram showing an example of the internal configuration of the memory system according to the first embodiment.

The memory controller 10 includes a host interface (host I/F) 11, a control unit 12, and a memory interface (memory I/F) 13-0 and a memory I/F 13-1.

The host I/F 11 is a hardware interface connected to the external host 2 via the host bus HB. The host I/F 11 communicates according to an interface standard between the host 2 and the memory controller 10. For example, the host I/F 11 may be in compliance with the interface standard such as Serial Advanced Technology Attachment (SATA), PCI express (PCIe™), or the like.

The control unit 12 is a circuit that controls the entire memory controller 10. The control unit 12 may serve as an Flash Translation Layer (FTL). For example, as hardware, the control unit 12 includes a processor such as a Central Processing Unit (CPU) and the like, a Read Only Memory (ROM), and a Random Access Memory (RAM).

Each of the memory I/F 13-0 and the memory I/F 13-1 is a hardware interface connected to the nonvolatile memory 20 via memory bus MB. Each of the memory I/F 13-0 and the memory I/F 13-1 performs communication between the nonvolatile memory 20 and the memory controller 10 according to the interface standard. For example, the memory I/F 13-0 and the memory I/F 13-1 may be in compliance with the interface standard such as NAND interface standard.

The nonvolatile memory 20 includes a chipset 21-0 and a chipset 21-1.

Each of the chipset 21-0 and the chipset 21-1 is a set of memory chips. The chipset 21-0 corresponds to the memory I/F 13-0. The chipset 21-1 corresponds to the memory I/F 13-1.

The memory bus MB includes channels CH0 and CH1.

The channels CH0 and CH1 are configured with different signal lines from each other. The channel CH0 connects between the chipset 21-0 and the memory I/F 13-0. The channel CH1 connects between the chipset 21-1 and the memory I/F 13-1.

Figure 3:
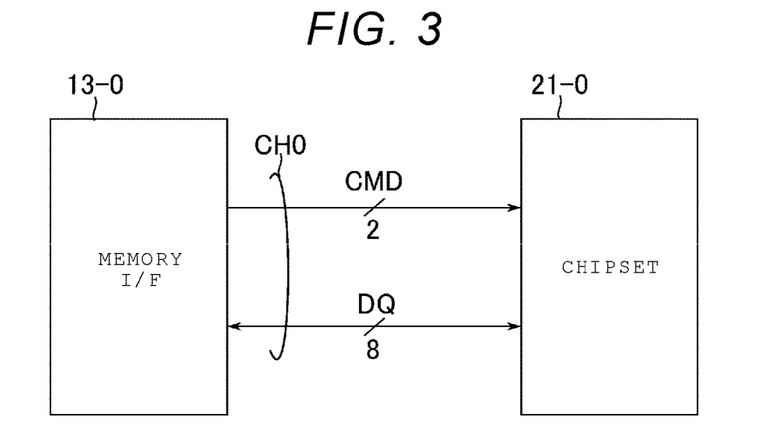
FIG. 3 is a block diagram showing an example of signal lines used in channels according to the first embodiment.

FIG. 3 is a block diagram showing an example of signal lines used in channels according to the first embodiment. FIG. 3 shows, as an example, signal lines for transmission and reception between the memory I/F 13-0 and the chipset 21-0. It is to be noted that the signal lines for transmission and reception between the memory I/F 13-1 and the chipset 21-1 is the same as the signal lines for transmission and reception between the memory I/F 13-0 and the chipset 21-0.

For example, the signal lines used in the channel CH0 include a signal line CMD and a signal line DQ.

For example, the signal line CMD is two signal lines. The signal line CMD is used for transmitting commands and addresses from the memory I/F 13-0 to the chipset 21-0.

For example, the signal lines DQ is eight signal lines different from the signal line CMD. The signal line DQ is used for transmitting and receiving data to be written to the chipset 21-0 and data to be read from the chipset 21-0.

The memory I/F 13-0 is configured to receive data from the chipset 21-0 using the signal line DQ, while transmitting commands and addresses to the chipset 21-0 using the signal line CMD. That is, the memory I/F 13-0 is configured to execute, in parallel, transmission of commands and addresses to the chipset 21-0 using the signal line CMD and reception of data from the chipset 21-0 using the signal line DQ.

1.1.3 Chipset

Figure 4:
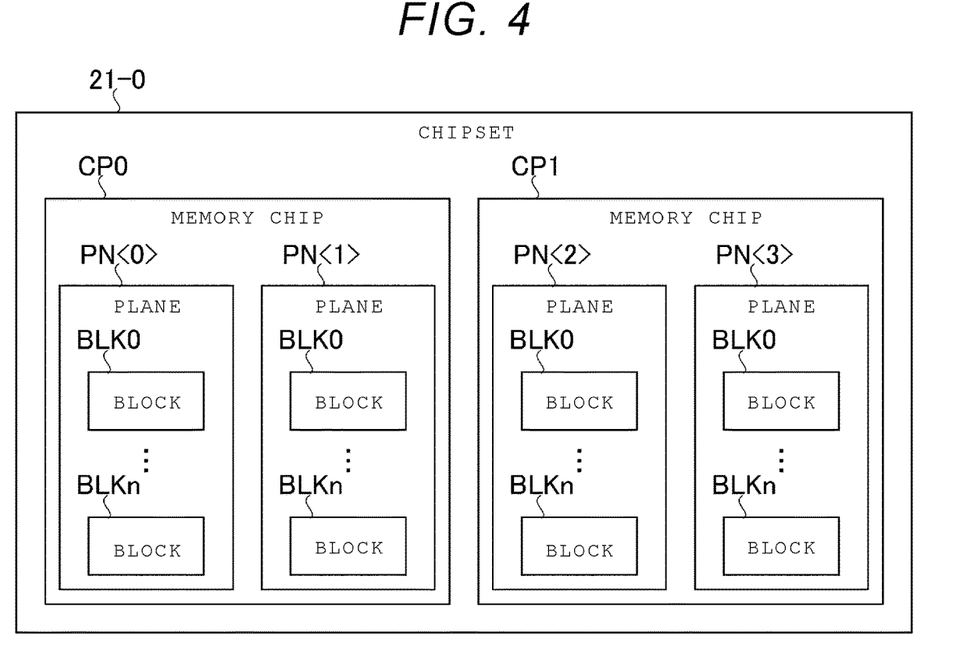
FIG. 4 is a block diagram showing an example of a configuration of a chipset according to the first embodiment.

FIG. 4 is a block diagram showing an example of a configuration of a chipset according to the first embodiment. FIG. 4 shows the configuration of the chipset 21-0 as an example. It is to be noted that the configuration of the chipset 21-1 is the same as that of the chipset 21-0.

The chipset 21-0 includes a memory chip CP0 and a memory chip CP1. The memory chip CP0 and the memory chip CP1 are configured to operate in parallel with the memory I/F 13-0 via the channel CH0.

The memory chip CP0 includes planes PN<0> and PN<1>. The memory chip CP1 includes planes PN<2> and PN<3>. The planes PN<0> and PN<1> are configured to operate in parallel in the memory chip CP0. The planes PN<2> and PN<3> are configured to operate in parallel in the memory chip CP1. That is, the planes PN<0>, PN<1>, PN<2>, and PN<3> are configured to operate in parallel with the memory I/F 13-0 via the channel CH0.

Each of the planes PN<0>, PN<1>, PN<2>, and PN<3> includes (n+1) blocks BLK0, . . . , and BLKn. For example, n is a natural number. A block BLK includes a plurality of memory cells. The block BLK is a minimum unit of data erasure. The minimum unit of data read is smaller than the block BLK.

Hereinafter, the total number of planes PN that operate in parallel with the memory I/F 13-0 is also referred to as a "number of planes" (four, in the example of FIG. 4). Any one of the planes PN<0>, PN<1>, PN<2>, and PN<3> is denoted as a plane PN.

1.1.4 Memory I/F

Figure 5:
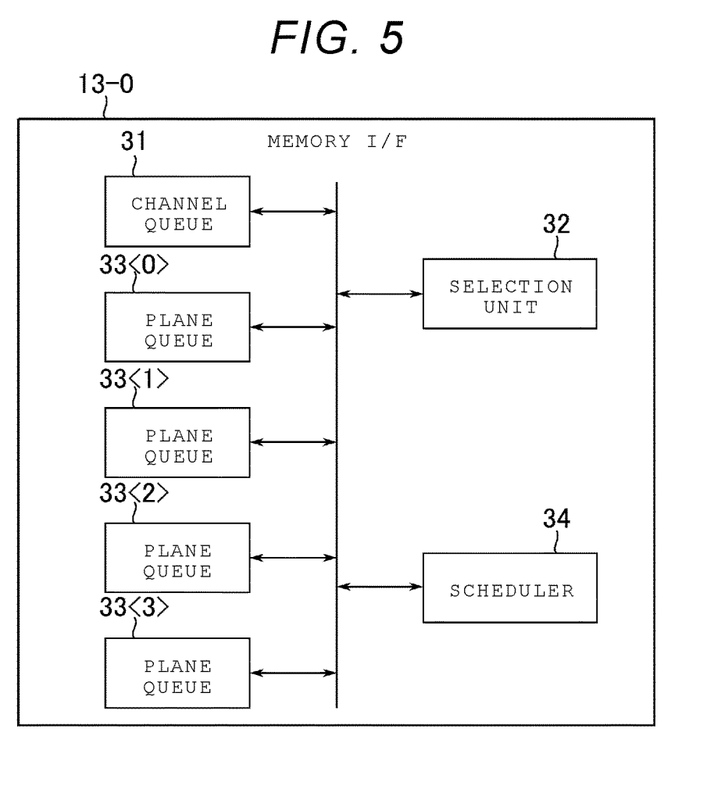
FIG. 5 is a block diagram showing an example of a configuration of a memory interface circuit according to the first embodiment.

FIG. 5 is a block diagram showing an example of a configuration of a memory I/F according to the first embodiment. FIG. 5 shows the configuration of the memory I/F 13-0 as an example. It is to be noted that the configuration of the memory I/F 13-1 is the same as that of the memory I/F 13-0.

The memory I/F 13-0 includes a channel queue 31, a selection unit 32, plane queues 33<0>, 33<1>, 33<2>, and 33<3>, and a scheduler 34. Any one of the plane queues 33<0>, 33<1>, 33<2>, and 33<3> is referred to as a plane queue 33.

The channel queue 31 is a memory for queuing pairs of commands and addresses. In the channel queue 31, for example, commands are queued in association with addresses specifying the chips CP, planes PN, and blocks BLK to execute the commands. The commands queued in the channel queue 31 are erased from the channel queue 31 as the corresponding processes are executed. Examples of the commands queued in the channel queue 31 include a read command and a write command.

The selection unit 32 is a circuit for passing commands between the channel queue 31 and the plane queues 33<0>, 33<1>, 33<2>, and 33<3>. The selection unit 32 selects, one by one, the commands from the plurality of commands queued in the channel queue 31 for queuing in each of the planes PN<0>, PN<1>, PN<2>, and PN<3>. The selection unit 32 subdivides the selected command into a plurality of commands. For example, when a read command is selected, the selection unit 32 subdivides the read command into four commands such as read sense, data out reservation, data out execution, and status read. The selection unit 32 stores the plurality of subdivided commands in the corresponding plane queue 33. The read sense, the data out reservation, the data out execution, and the status read are commands for instructing, respectively, execution of read sense process, reservation of data out process, execution of data out process, and execution of status read process. The read sense process is a process of sensing a threshold voltage of a memory cell to determine data stored in the memory cell. The data out process is a process of transmitting the data determined by the read sense process to the memory controller 10. The status read process is a process of determining whether the read sense process is being executed. For example, a plane PN currently executing the read sense process fails in the status read process. A plane PN that is not executing the read sense process passes the status read process.

The plane queues 33<0>, 33<1>, 33<2>, and 33<3> are memories for queuing the pairs of commands and addresses for the next transmission to the planes PN<0>, PN<1>, PN<2>, and PN<3>, respectively. For example, each of the plane queues 33<0>, 33<1>, 33<2>, and 33<3> stores, queued in association with each other, a command subdivided by the channel queue 31 and an address specifying a block BLK to execute the command. The commands queued in the plane queues 33<0>, 33<1>, 33<2>, and 33<3> are erased from the plane queues 33<0>, 33<1>, 33<2>, and 33<3> as the corresponding processes are executed.

The scheduler 34 is a circuit that controls the timing of transmitting the commands. The scheduler 34 determines the transmission timing of the commands queued in each of the plane queues 33<0>, 33<1>, 33<2>, and 33<3> based on a processing state and a priority. The processing state is information for determining whether the plane PN is executing the process, the type of process under execution, and the like. Examples of the processing state include a busy state, an idle state, and a ready state. When the most recently transmitted command is read sense, the scheduler 34 manages the processing state of the plane PN as the busy state. When the most recently transmitted command is data out reservation, the scheduler 34 manages the processing state of the plane PN as the idle state. The scheduler 34 manages the state of the plane PN that passed the status read process as the ready state. The priority is information for determining the transmission order of the data out reservations queued in each of the plane queues 33<0>, 33<1>, 33<2>, and 33<3>. For example, the priority may be a positive number. The scheduler 34 is configured to transmit the data out reservations associated with higher priorities first.

1.2 Operation

Next, the operation of the memory system according to the first embodiment will be described.

1.2.1 Overview of Transmission Command Adjustment Process

Figure 6:
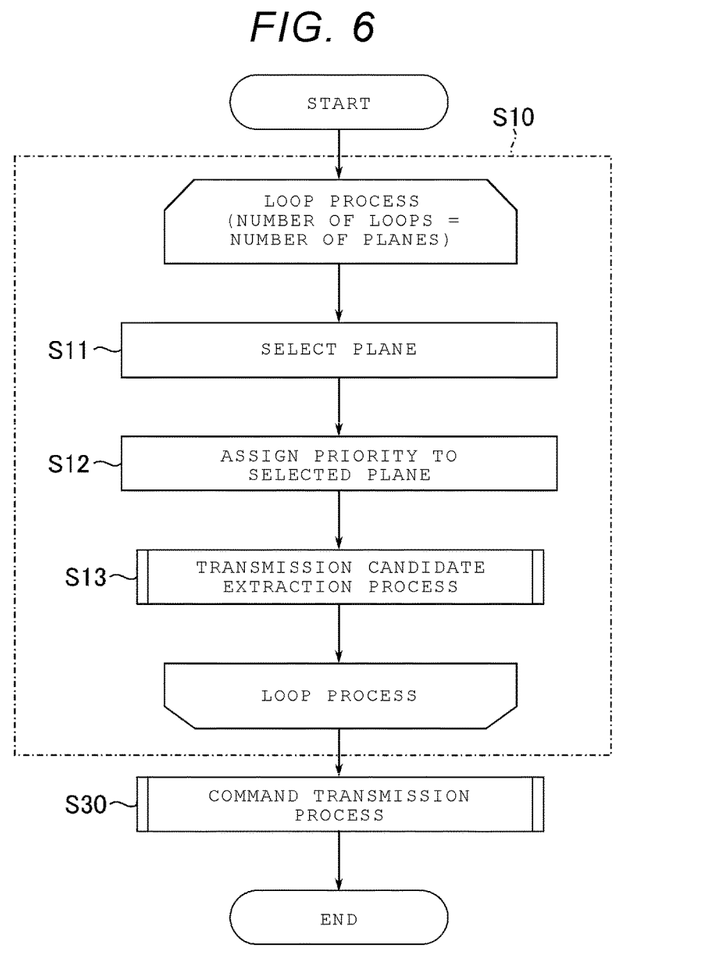
FIG. 6 is a flowchart showing an example of an overview of a transmission command adjustment process in the memory system according to the first embodiment.

FIG. 6 is a flowchart showing an example of an overview of a transmission command adjustment process in the memory system according to the first embodiment.

When the start condition is satisfied (start), the scheduler 34 executes loop process (S10). The start condition may include an elapse of a predetermined time since the start of the immediately preceding transmission command adjustment process. The predetermined time is designed to be longer than the time required for one transmission command adjustment process. The start condition may include the end of the immediately preceding transmission command adjustment process. The loop process of S10 loops by the number of planes. A loop unit of the loop process of S10 includes processes of S11, S12, and S13.

In the loop unit of the loop process of S10, the scheduler 34 selects one plane PN (S11). For example, the round robin method is applied as a method for selecting the plane PN. Hereinafter, the plane PN selected in the process of S11 and the plane queue 33 corresponding to the plane PN selected in the process of S11 are denoted as a plane PN<x> and a plane queue 33<x>, respectively.

The scheduler 34 assigns priority to the plane PN<x> (S12).

The scheduler 34 executes transmission candidate extraction process based on the priorities assigned in the process of S12 (S13).

The transmission candidate extraction process is a process of extracting a transmission candidate, which is a candidate for the next command to be transmitted, from the commands queued in the plane queue 33<x>. By the transmission candidate extraction process, by the end of the loop process of S10, a maximum of one read sense, a maximum of one data out reservation, and a maximum of one status read are extracted as the transmission candidates.

When the loop process of S10 ends, the scheduler 34 executes a command transmission process (S30). The command transmission process is a process of transmitting one command from the extracted transmission candidates.

When the process of S30 ends, the transmission command adjustment process ends (end).

1.2.2 Details of Priority Assignment

Figure 7:
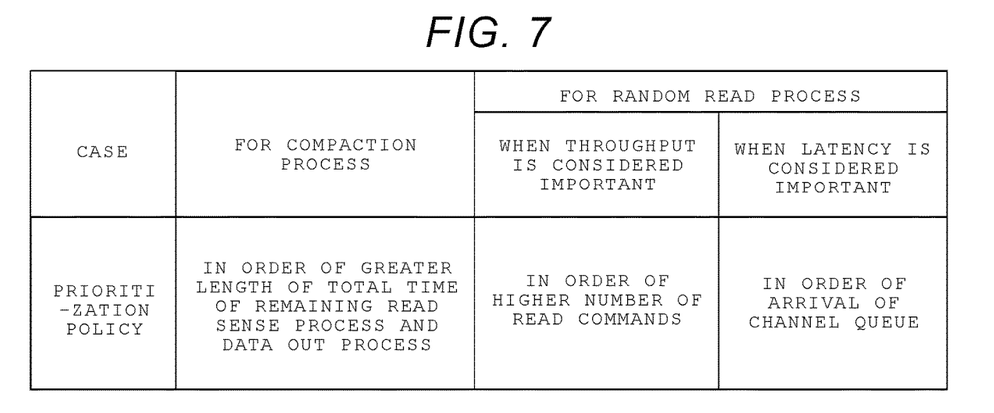
FIG. 7 is a diagram showing an example of a priority assignment policy in the memory system according to the first embodiment.

FIG. 7 is a diagram showing an example of a priority assignment policy in the memory system according to the first embodiment. FIG. 7 corresponds to the process of S12 in FIG. 6. FIG. 7 shows three types of cases with different priority assignment policies.

The first case corresponds to when the read commands associated with a compaction process are queued in the channel queue 31. The second case corresponds to when the read commands associated with a random read process are queued in the channel queue 31 and when throughput is considered important. The third case corresponds to when the read commands associated with the random read process are queued in the channel queue 31 and when latency is considered important.

In the first case, the scheduler 34 calculates, for each plane PN, the total time of the read sense process and the data out process executed by the remaining read commands. The scheduler 34 assigns the priority to the plane PN<x> according to the calculated total time. For example, the scheduler 34 assigns the highest priority to the plane PN<x> having the highest total time.

In the second case, the scheduler 34 calculates the number of read commands queued in the channel queue 31 for each plane PN. The scheduler 34 assigns a priority to the plane PN<x> according to the calculated number of read commands. For example, the scheduler 34 assigns the highest priority to the plane PN<x> having the largest number of read commands.

It is to be noted that in the second case, as in the first case, the scheduler 34 may assign the priority to the plane PN<x> according to the total time of the read sense process and the data out process executed by the remaining read commands.

In the third case, the scheduler 34 calculates the arrival order of the read commands queued in the channel queue 31 for each plane PN. The scheduler 34 assigns a priority to the plane PN<x> according to the calculated arrival order. For example, the scheduler 34 assigns the highest priority to the plane PN<x> having the earliest arrival order.

1.2.3 Details of Transmission Candidate Extraction Process

Figure 8:
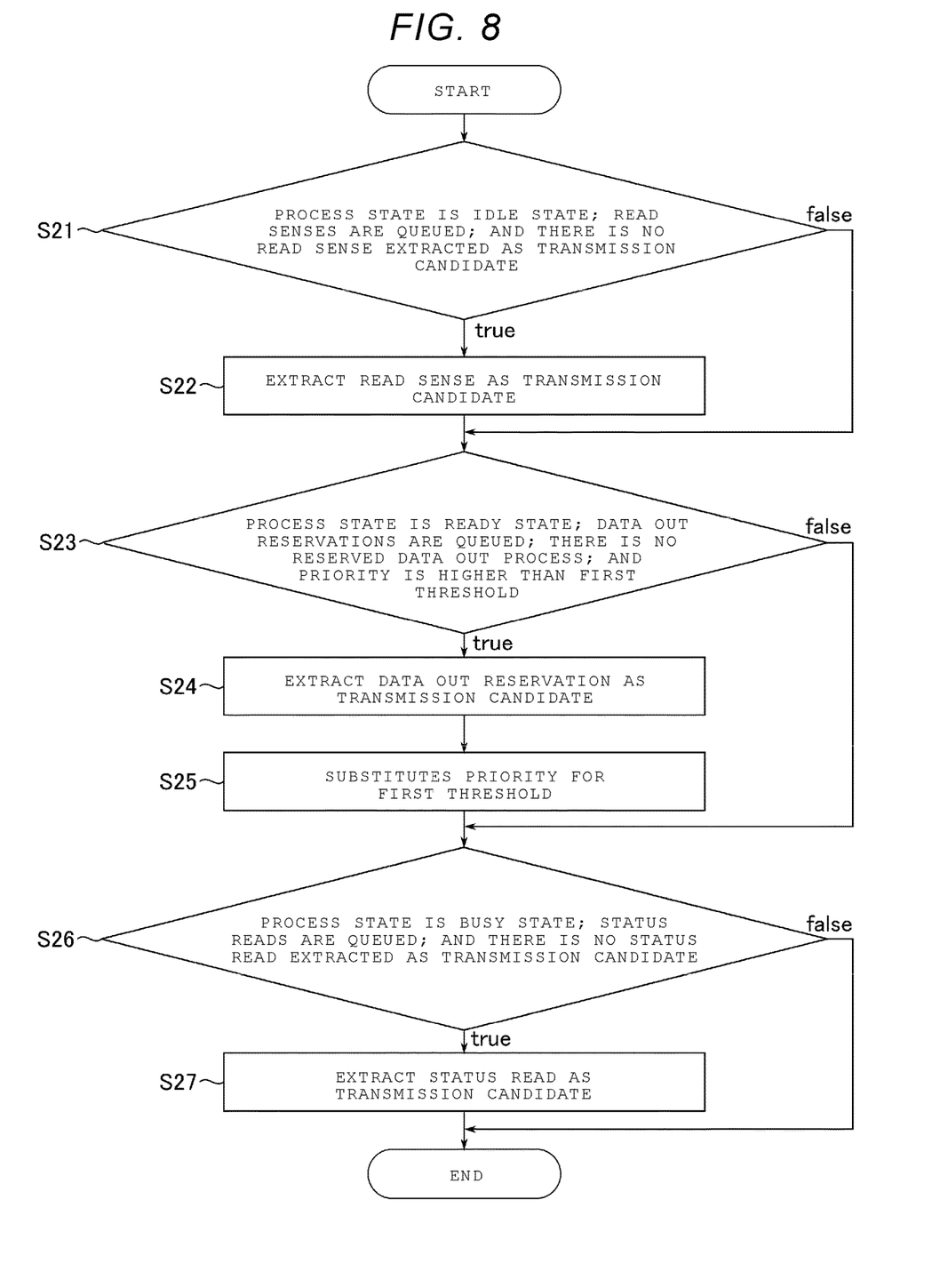
FIG. 8 is a flowchart showing an example of a transmission candidate extraction process in the memory system according to the first embodiment.

FIG. 8 is a flowchart showing an example of a transmission candidate extraction process in the memory system according to the first embodiment. FIG. 8 corresponds to the process of S13 in FIG. 6.

When the process of S12 for plane PN<x> ends (start), the scheduler 34 determines whether the first extraction condition is satisfied (S21). The first extraction condition is as follows: the processing state of the plane PN<x> is the idle state; the read senses are queued in the plane queue 33<x>; and there is no read sense extracted as the transmission candidate.

When the first extraction condition is satisfied (S21; true), the scheduler 34 extracts the read senses queued in the plane queue 33<x> as the transmission candidates (S22).

When the first extraction condition is not satisfied (S21; false), or after the process of S22, the scheduler 34 determines whether the second extraction condition is satisfied (S23). The second extraction condition is as follows: the processing state of plane PN<x> is the ready state; the data out reservations are queued in the plane queue 33<x>; there is no reserved data out process; and the priority of plane PN<x> is higher than a first threshold. The first threshold is a number that is equal to or greater than the minimum priority value and equal to or less than the maximum priority value.

When the second extraction condition is satisfied (S23; true), the scheduler 34 extracts the data out reservations queued in the plane queue 33<x> as the transmission candidates (S24).

After S24, the scheduler 34 substitutes the priority of the plane PN<x> for the first threshold (S25).

When the second extraction condition is not satisfied (S23; false), or after the process of S25, the scheduler 34 determines whether the third extraction condition is satisfied (S26). The third extraction condition is as follows: the processing state of plane PN<x> is a busy state; the status reads are queued in the plane queue 33<x>; and no status read is extracted as the transmission candidate.

When the third extraction condition is satisfied (S26; true), the scheduler 34 extracts the status reads queued in the plane queue 33<x> as the transmission candidates (S27).

When the third extraction condition is not satisfied (S26; false), or after the process of S27, the transmission candidate extraction process ends (end).

1.2.4 Details of Command Transmission Process

Figure 9:
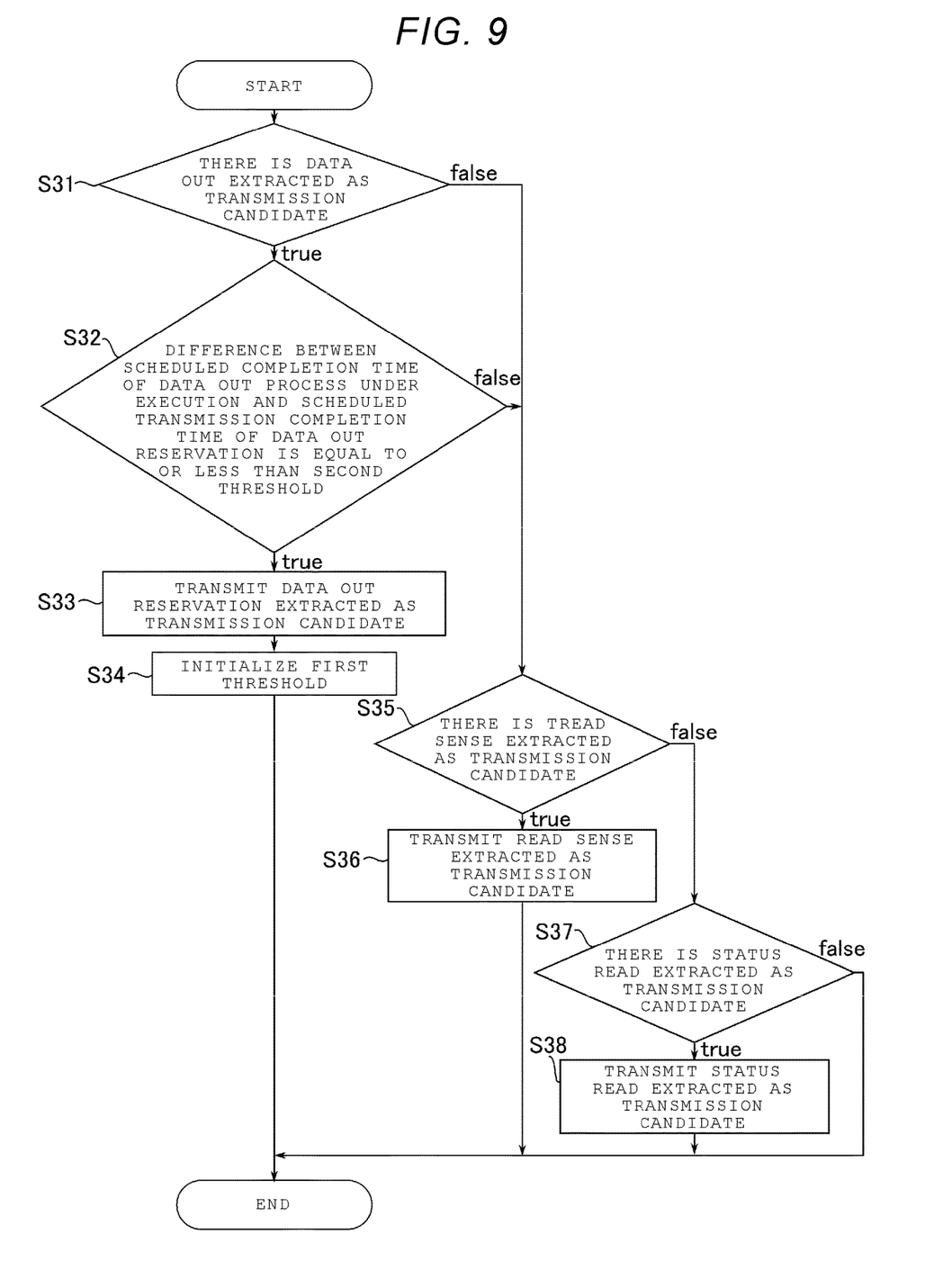
FIG. 9 is a flowchart showing an example of a command transmission process in the memory system according to the first embodiment.

FIG. 9 is a flowchart showing an example of a command transmission process in the memory system according to the first embodiment. FIG. 9 corresponds to the process of S30 in FIG. 6.

When the loop process of S10 ends (start), the scheduler 34 determines whether there is the data out reservation extracted as the transmission candidate (S31).

When there is the data out reservation extracted as the transmission candidate (S31; true), the scheduler 34 determines whether a transmission timing condition is satisfied (S32). The transmission timing condition is as follows: a difference between a scheduled completion time of data out process under execution and a scheduled transmission completion time of data out reservation is equal to or less than a second threshold. When the transmission of the data out reservation starts from the determination point (current time) of S32, the scheduled transmission completion time of data out reservation is a scheduled time at which the transmission of the data out reservation is completed. For example, the second threshold is designed to be equal to or less than the time required to transmit another command. That is, the condition that satisfies the transmission timing condition may be substituted with a condition that there is no time when the command other than the data out reservation is transmitted, from the time of determination in S32 until the completion of the data out process under execution.

When the transmission timing condition is satisfied (S32; true), the scheduler 34 transmits the data out reservation extracted as the transmission candidate (S33).

After the process of S33, the scheduler 34 initializes the first threshold to the minimum priority value, for example (S34).

When there is no data out reservation extracted as the transmission candidate (S31; false), or when the transmission timing condition is not satisfied (S32; false), the scheduler 34 determines whether there is a read sense extracted as the transmission candidate (S35).

When there is a read sense extracted as the transmission candidate (S35; true), the scheduler 34 transmits the read sense extracted as the transmission candidate (S36).

When there is no read sense extracted as the transmission candidate (S35; false), the scheduler 34 determines whether there is a status read extracted as the transmission candidate (S37).

When there is a status read extracted as the transmission candidate (S37; true), the scheduler 34 transmits the status read extracted as the transmission candidate (S38).

After the processes of S34, S36, and S38, or when there is no status read extracted as the transmission candidate (S37; false), the command transmission process ends (end).

1.2.5 Operation Example

Figure 10:
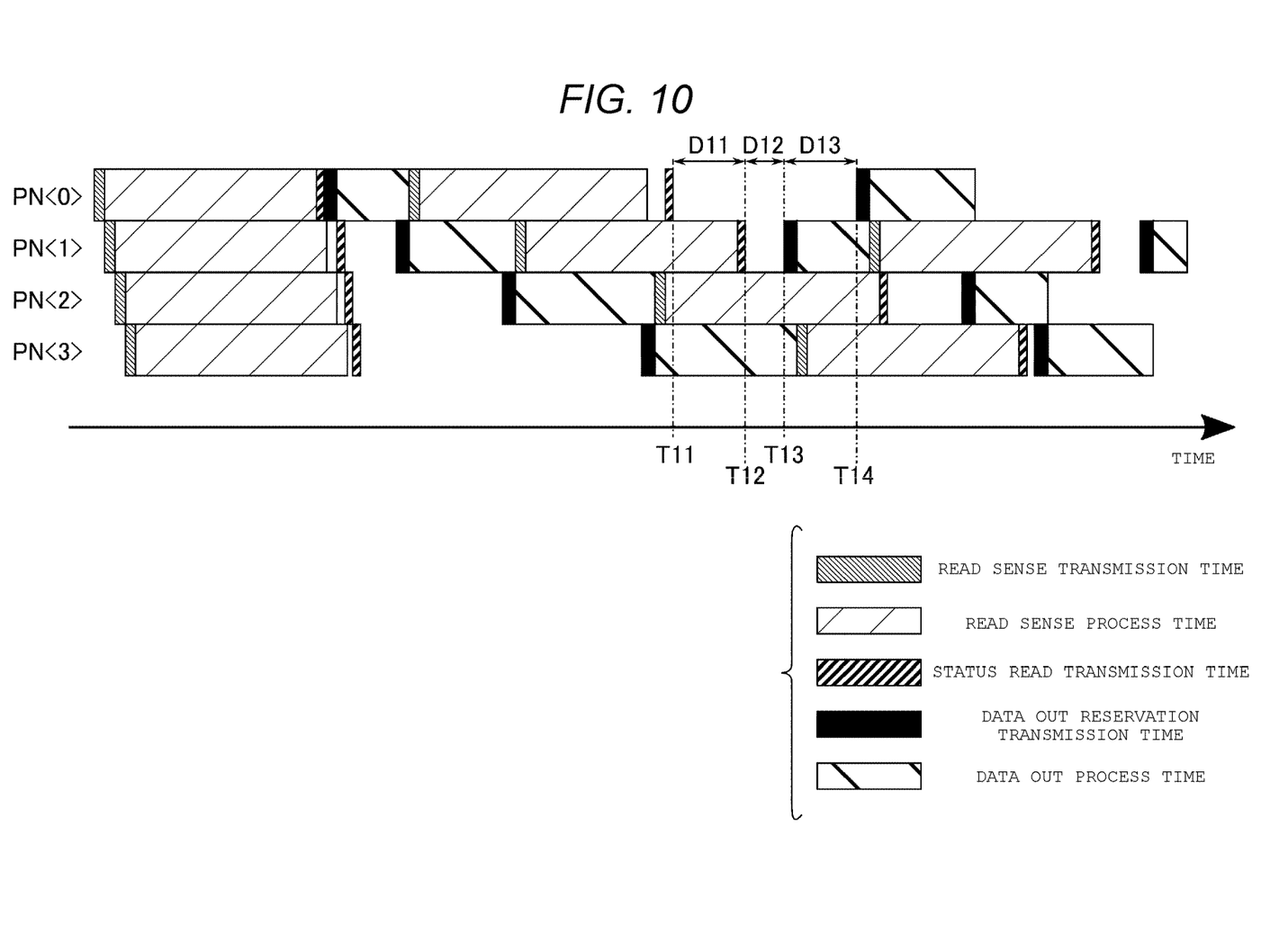
FIG. 10 is a diagram showing an operation example in the transmission command adjustment process in the memory system according to the first embodiment.

FIG. 10 is a diagram showing an operation example in the transmission command adjustment process in the memory system according to the first embodiment. FIG. 10 shows, for each of the planes PN<0>, PN<1>, PN<2>, and PN<3>, the transmission times of the commands subdivided according to a series of read commands queued in the channel queue 31, and the execution times of the processes corresponding to the commands.

The transmission times of the commands shown in FIG. 10 include read sense transmission time, status read transmission time, and data out reservation transmission time. In FIG. 10, the end of the status read transmission time means that the target plane PN passed the status read process.

The process execution times shown in FIG. 10 are the read sense process time and the data out process time. In FIG. 10, the transmission time of the data out execution for instructing the start of the data out process is omitted.

Hereinafter, the operation from time T11 to time T14 will be described with reference to FIG. 10. The time T11 refers to when the plane PN<0> is in the ready state. The time T12 refers to when the plane PN<1> is in the ready state. The time T13 refers to when the difference between the scheduled completion time of data out process under execution in plane PN<3> and the scheduled transmission completion time of data out reservation is equal to or less than the second threshold. The time T14 refers to when the difference between the scheduled completion time of data out process under execution in plane PN<1> and the scheduled transmission completion time of data out reservation is equal to or less than the second threshold. A period D11 refers to a period between the time T11 (inclusive) and the time T12. In the period D11, the processing states of the planes PN<1>, PN<2>, and PN<3> are busy state, busy state, and idle state, respectively. A period D12 refers to a period between the time T12 (inclusive) and the time T13. In the period D12, the processing states of the planes PN<2> and PN<3> are busy state and idle state, respectively. A period D13 refers to a period between the time T13 (inclusive) and the time T14.

In the priority assignment process (S12) in the period D11, the scheduler 34 substitutes the priority assigned to the plane PN<0> for the first threshold.

In the transmission candidate extraction process (S13) in the period D11, the scheduler 34 extracts the data out reservations queued in the plane queue 33<0> as the transmission candidates.

In the command transmission process (S30) in the period D11, the scheduler 34 determines that the difference between the scheduled completion time of data out process under execution in the plane PN<3> and the scheduled transmission completion time of data out reservation exceeds the second threshold. Therefore, in the period D11, the scheduler 34 does not transmit the data out reservation to the plane PN<0>. That is, in the period D11, the plane PN<0> is in the ready state.

In the priority assignment process (S12) in the period D12, the scheduler 34 assigns a priority higher than the first threshold to the plane PN<1>.

In the transmission candidate extraction process (S13) in the period D12, instead of the data out reservations queued in the plane queue 33<0>, the scheduler 34 extracts the data out reservations queued in the plane queue 33<1> as the transmission candidates.

In the command transmission process (S30) in the period D12, the scheduler 34 determines that the difference between the scheduled completion time of data out process under execution in the plane PN<3> and the scheduled transmission completion time of data out reservation exceeds the second threshold. Therefore, in the period D12, the scheduler 34 does not transmit data out reservations to the planes PN<0> and PN<1>. That is, in the period D12, the planes PN<0> and PN<1> are in the ready state.

In the command transmission process (S30) at the time T13, the scheduler 34 determines that the difference between the scheduled completion time of data out process under execution in the plane PN<3> and the scheduled transmission completion time of data out reservation is equal to or less than the second threshold. Therefore, at the time T13, the scheduler 34 transmits the data out reservation to the plane PN<1>. Accordingly, the first threshold is initialized.

After the transmission of the data out reservation to the plane PN<1> is completed in the period D13, the processing state of the plane PN<1> is the idle state. In the period D13, the processing state of plane PN<2> is the busy state. In the period D13, the processing state of the plane PN<3> is the idle or busy state. In the period D13, when the data out process for the plane PN<3> is completed, the scheduler 34 transmits the data out execution to the plane PN<1>. Accordingly, the plane PN<1> starts the data out process.

In the transmission candidate extraction process (S13) in the period D13, the scheduler 34 extracts the data out reservations queued in the plane queue 33<0> as the transmission candidates.

In the command transmission process (S30) in the period D13, the scheduler 34 determines that the difference between the scheduled completion time of data out process under execution in the plane PN<1> and the scheduled transmission completion time of data out reservation exceeds the second threshold. Therefore, in the period D13, the scheduler 34 does not transmit the data out reservation to the plane PN<0>. That is, in the period D13, the plane PN<0> is in the ready state.

At the time T14, the scheduler 34 determines that the difference between the scheduled completion time of data out process under execution in the plane PN<1> and the scheduled transmission completion time of data out reservation is equal to or less than the second threshold. Therefore, at the time T14, the scheduler 34 transmits the data out reservation to the plane PN<0>.

1.3 Effect of First Embodiment

According to the first embodiment, the scheduler 34 is configured such that, when the plane PN<3> is executing the data out process, the scheduler 34 suspends the transmission of the data out reservations to the planes PN<0> and PN<1> until the transmission timing condition is satisfied. As a result, the plane PN to transmit the data out reservation to can be determined immediately before the data out process of the plane PN<3> is completed. Therefore, it is possible to select a plane PN with a higher data read efficiency than when the plane PN for executing the next data out process is determined at the time of queuing the data out reservation.

When the compaction process is being executed, the scheduler 34 can check the number of read sense processes and data out processes executed in each of the planes PN<0>, PN<1>, PN<2>, and PN<3>. According to the first embodiment, when the compaction process is being executed, the scheduler 34 assigns the priority to the planes PN according to a length of the total time of the remaining read sense process and data out process. As a result, a deviation of the total time of the remaining read sense process and data out process for each plane PN can be reduced. Therefore, it is possible to enhance the efficiency of performing the compaction process.

When the random read process is being executed, the number of queues in the channel queue 31 is given an upper limit. According to the first embodiment, when the random read process is being executed and when throughput is considered important, the scheduler 34 may assign the priority to the planes PN according to the number of queues in the channel queue 31. As a result, a deviation in the number of queues in the channel queue 31 for each plane PN can be reduced. Therefore, throughput can be enhanced.

According to the first embodiment, when the random read process is being and when latency is considered important, the scheduler 34 may assign the priority to the planes PN according to the order of queues in the channel queue 31. As a result, it is possible to reduce a deviation of the time for each plane PN until the queues in the channel queue 31 are transmitted. Therefore, latency can be enhanced.

2. Second Embodiment

Next, a memory system according to a second embodiment will be described. The memory system according to the second embodiment differs from the first embodiment in the transmission candidate extraction process for the data out reservation and the command transmission process. Hereinafter, the operations different from the first embodiment will be described.

2.1 Details of Transmission Candidate Extraction Process

Figure 11:
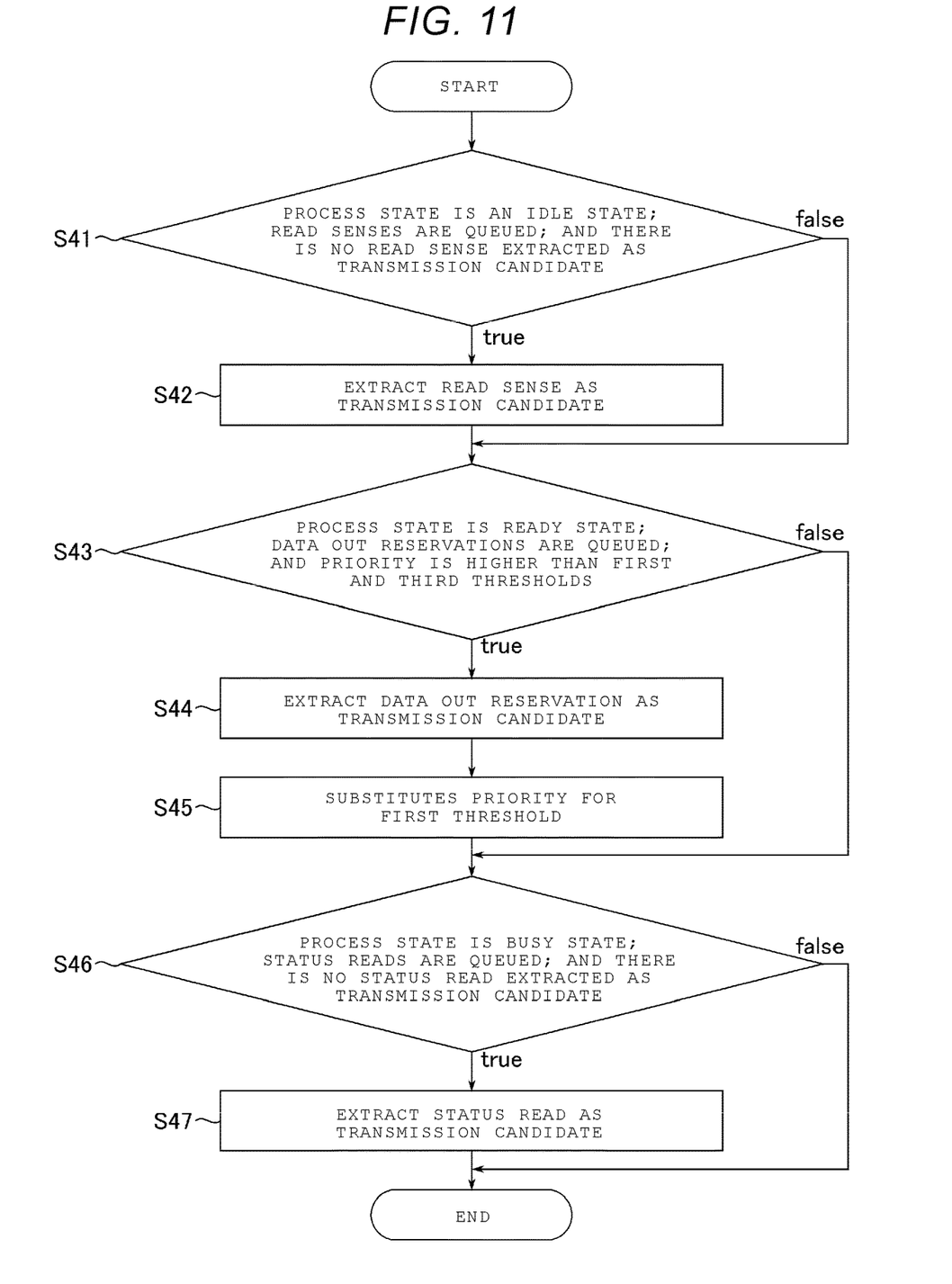
FIG. 11 is a flowchart showing an example of a transmission candidate extraction process in a memory system according to a second embodiment.

FIG. 11 is a flowchart showing an example of the transmission candidate extraction process in the memory system according to the second embodiment. FIG. 11 corresponds to FIG. 8 in the first embodiment.

When the process of S12 for plane PN<x> ends (start), the scheduler 34 determines whether the first extraction condition is satisfied (S41).

When the first extraction condition is satisfied (S41; true), the scheduler 34 extracts the read senses queued in the plane queue 33<x> as the transmission candidates (S42).

When the first extraction condition is not satisfied (S41; false), or after the process of S42, the scheduler 34 determines whether the fourth extraction condition is satisfied (S43). The fourth extraction condition is as follows: the processing state of plane PN<x> is the ready state; the data out reservations are queued in the plane queue 33<x>; and the priority of the plane PN<x> is higher than the first and third thresholds.

The third threshold is a number that is equal to or greater than 0 and equal to or less than the maximum priority value. For example, the third threshold is initialized to 0, for example, upon transmission of a data out execution.

When the fourth extraction condition is satisfied (S43; true), the scheduler 34 extracts the data out reservations queued in the plane queue 33<x> as the transmission candidates (S44).

After S44, the scheduler 34 substitutes the priority of the plane PN<x> for the first threshold (S45).

When the fourth extraction condition is not satisfied (S43; false), or after the process of S45, the scheduler 34 determines whether the third extraction condition is satisfied (S46).

When the third extraction condition is satisfied (S46; true), the scheduler 34 extracts the status reads queued in the plane queue 33<x> as the transmission candidates (S47).

When the third extraction condition is not satisfied (S46; false), or after the process of S47, the transmission candidate extraction process ends (end).

2.2 Details of Command Transmission Process

Figure 12:
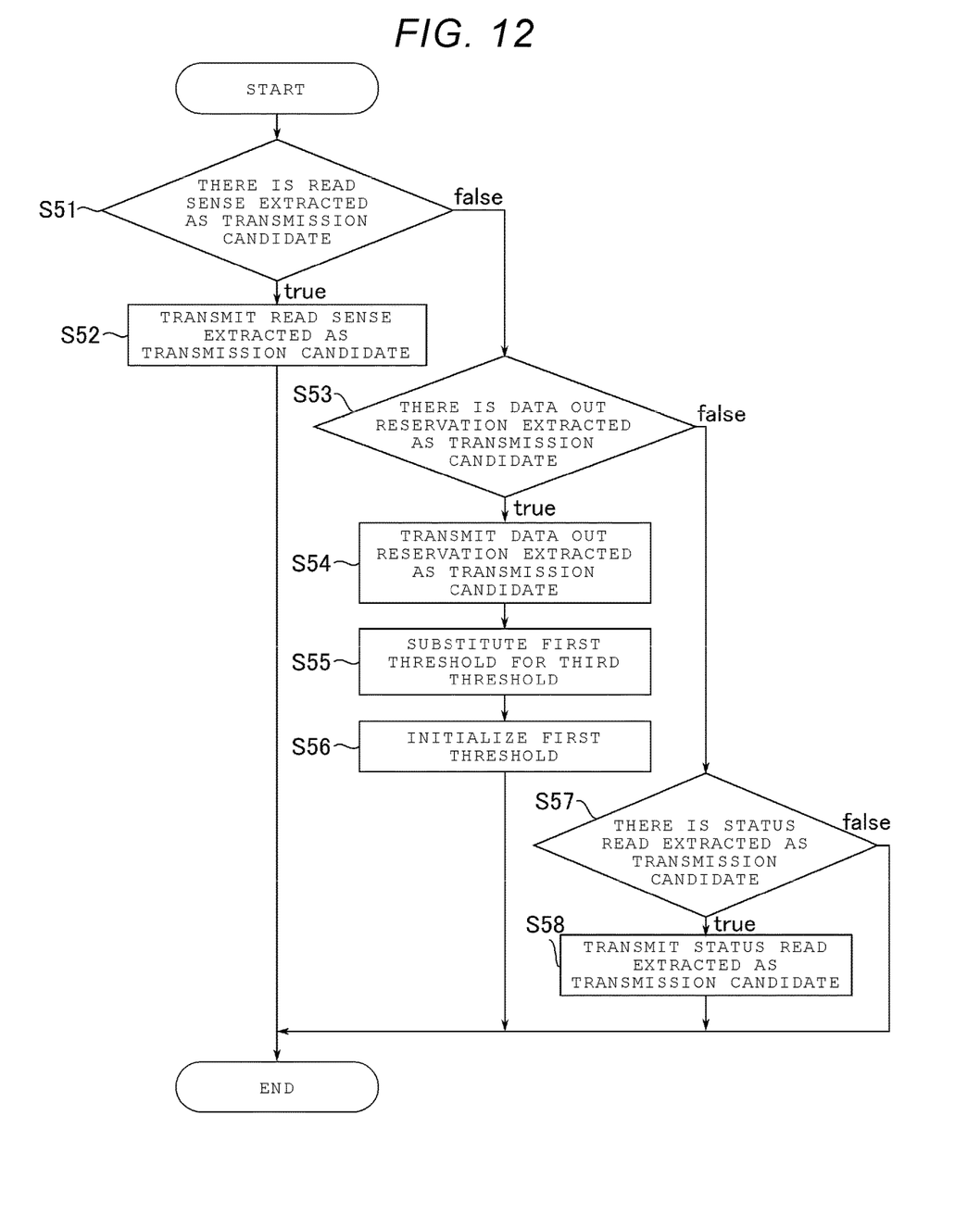
FIG. 12 is a flowchart showing an example of a command transmission process in the memory system according to the second embodiment.

FIG. 12 is a flowchart showing an example of a command transmission process in the memory system according to the second embodiment. FIG. 12 corresponds to FIG. 9 in the first embodiment.

When the loop process of S10 ends (start), the scheduler 34 determines whether there is a read sense extracted as the transmission candidate (S51).

When there is a read sense extracted as the transmission candidate (S51; true), the scheduler 34 transmits the read sense extracted as the transmission candidate (S52).

When there is no read sense extracted as the transmission candidate (S52; false), the scheduler 34 determines whether there is a data out reservation extracted as the transmission candidate (S53).

When there is a data out reservation extracted as the transmission candidate (S53; true), the scheduler 34 transmits the data out reservation extracted as the transmission candidate (S54).

After the process of S54, the scheduler 34 substitutes the first threshold for the third threshold (S55).

After the process of S55, the scheduler 34 initializes the first threshold to the minimum priority value, for example (S56).

When there is no data out reservation extracted as the transmission candidate (S53; false), the scheduler 34 determines whether there is a status read extracted as the transmission candidate (S57).

When there is a status read extracted as the transmission candidate (S57; true), the scheduler 34 transmits the status read extracted as the transmission candidate (S58).

After the processes of S52, S56, and S58, or when there is no status read extracted as the transmission candidate (S57; false), the command transmission process ends (end).

2.3 Operation Example

Figure 13:
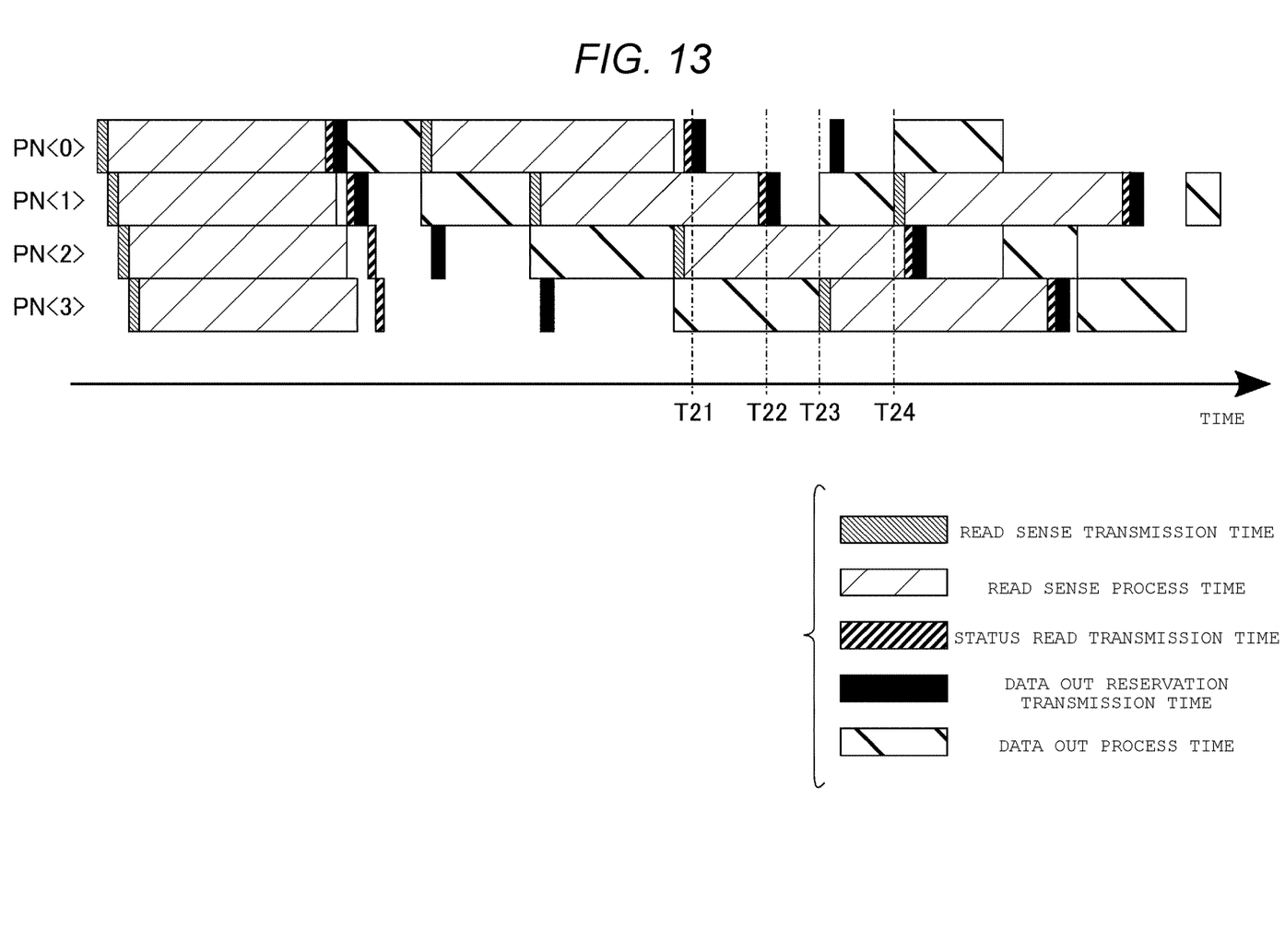
FIG. 13 is a diagram showing an operation example of the transmission command adjustment process in the memory system according to the second embodiment.

FIG. 13 is a diagram showing an operation example of a transmission command adjustment process in the memory system according to the second embodiment. FIG. 13 corresponds to FIG. 10 in the first embodiment.

Hereinafter, the operation from time T21 to time T24 will be described with reference to FIG. 13. The time T21 refers to when the plane PN<0> is in the ready state. At the time T21, the processing states of the planes PN<1>, PN<2>, and PN<3> are the busy state, the busy state, and the idle state, respectively. The time T22 refers to when the plane PN<1> is in the ready state. At the time T22, the processing states of the planes PN<0>, PN<2>, and PN<3> are the idle state, the busy state, and the idle state, respectively. The time T23 refers to when the data out process under execution in the plane PN<3> is completed. At the time T23, the processing states of the planes PN<0>, PN<1>, and PN<2> are the idle state, the idle state, and the busy state, respectively. The time T24 refers to when the data out process under execution in the plane PN<1> is completed. At the time T24, the processing states of the planes PN<2> and PN<3> are the busy state, and the busy state, respectively.

In the transmission candidate extraction process (S13) at the time T21, the scheduler 34 extracts the data out reservations queued in the plane queue 33<0> as the transmission candidates. Accordingly, the priority assigned to the plane PN<0> is substituted for the first threshold.

In the command transmission process (S30) at the time T21, the scheduler 34 transmits the data out reservation to the plane PN<0>. After the transmission of the data out reservation is completed, the plane PN<0> enters the idle state and is reserved for the data out process. Accordingly, the first threshold is substituted for the third threshold. Then, the first threshold is initialized.

In the priority assignment process (S12) at the time T22, the scheduler 34 assigns a priority higher than the first and third thresholds to the plane PN<1>.

According to the process of S12, in the transmission candidate extraction process (S13) at the time T22, the scheduler 34 extracts the data out reservations queued in the plane queue 33<1> as the transmission candidates. Accordingly, the priority assigned to the plane PN<1> is substituted for the first threshold.

In the command transmission process (S30) at the time T22, the scheduler 34 transmits the data out reservation to the plane PN<1>. After the transmission of the data out reservation is completed, the plane PN<1> enters the idle state and is reserved for the data out process. Accordingly, the first threshold is substituted for the third threshold. Then, the first threshold is initialized.

At the time T23, the scheduler 34 transmits a data out execution to the plane PN<1>. Accordingly, the plane PN<1> starts a data out process. In addition, the third threshold is initialized.

In the transmission candidate extraction process (S13) at the time T23, the scheduler 34 extracts the read senses queued in the plane queue 33<3> and the data out reservations queued in the plane queue 33<0> as the transmission candidates.

In the command transmission process (S30) at the time T23, the scheduler 34 transmits the read sense to the plane PN<3>. After the transmission of the read sense is completed, the plane PN<3> is in the busy state.

In addition, in the command transmission process (S30) at the time after the read sense is transmitted to the plane PN<3>, the scheduler 34 transmits a data out reservation. The idle state is entered and the data out process is reserved. After the transmission of the data out reservation is completed, the plane PN<0> enters the idle state and is reserved for the data out process.

At the time T24, the scheduler 34 transmits a data out execution to the plane PN<0>. Accordingly, the plane PN<0> starts a data out process.

2.4 Effect of Second Embodiment

According to the second embodiment, the scheduler 34 transmits the data out reservation to the plane PN<0> when the data out process is being executed, and transmits the data out reservation to the plane PN<1> when the priority of the plane PN<1> is higher than the first and third thresholds. Therefore, it is possible to select a plane PN with a higher data read efficiency than when the plane PN for executing the next data out process is determined at the time of queuing the data out reservation.

When the compaction process is being executed, the scheduler 34 can check the number of read sense processes and data out processes executed in each of the planes PN<0>, PN<1>, PN<2>, and PN<3>. According to the second embodiment, when the compaction process is being executed, the scheduler 34 assigns the priority to the planes PN according to a length of the total time of the remaining read sense process and data out process. As a result, a deviation of the total time of the remaining read sense process and data out process for each plane PN can be reduced. Therefore, it is possible to enhance the efficiency of performing the compaction process.

When the random read process is being executed, the number of queues in the channel queue 31 is given an upper limit. According to the second embodiment, when the random read process is being executed and when throughput is considered important, the scheduler 34 may assign the priority to the planes PN according to the number of queues in the channel queue 31. As a result, a deviation in the number of queues in the channel queue 31 for each plane PN can be reduced. Therefore, throughput can be enhanced.

According to the second embodiment, when the random read process is being executed and when latency is considered important, the scheduler 34 may assign priority to planes PN according to the order of queues in the channel queue 31. As a result, it is possible to reduce a deviation of the time for each plane PN until the queues in the channel queue 31 are transmitted. Therefore, latency can be enhanced.

3. Others

In the first and second embodiments described above, it is described that the nonvolatile memory 20 includes two chipsets 21-0 and 21-1, but aspects are not limited thereto. The nonvolatile memory 20 may include three or more chipsets. The nonvolatile memory 20 may include a single chipset.

In the first and second embodiments described above, it is described that the chipset 21-0 includes the two memory chips CP0 and CP1, but aspects are not limited thereto. The chipset 21-0 may include three or more memory chips. The chipset 21-0 may include one memory chip.

In the first and second embodiments described above, it is described that the chipset 21-0 includes four planes PN<0>, PN<1>, PN<2>, and PN<3>, but aspects are not limited thereto. The chipset 21-0 may include five or more planes. The chipset 21-0 may include two or three planes.

The embodiments are illustrative and the scope of the disclosure is not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a nonvolatile memory including first, second, and third planes each including a plurality of memory cells; and
a memory controller configured to:
transmit commands to the first, second, and third planes via a first signal line,
receive data from the first, second, and third planes via a second signal line,
when the first plane is executing a first process, suspend transmission of a first command instructing reservation of the first process to the second plane until a first condition is satisfied, and suspend transmission of a second command instructing reservation of the first process to the third plane until the first condition is satisfied, and
when a random read process is being executed, determine which of the first command or the second command is to be transmitted first, based on a result of comparing a first number of queued commands associated with the second plane and a second number of queued commands associated with the third plane.

2. The memory system according to claim 1, wherein the first process includes a process of transmitting data read from the nonvolatile memory to the memory controller.

3. The memory system according to claim 1, wherein the first condition includes a difference between a first time and a second time being equal to or less than a threshold, wherein the first time is when the first process being executed by the first plane is completed, and, when the transmission of the first command is started from a current time, the second time is when the transmission of the first command is completed.

4. The memory system according to claim 1, wherein the memory controller is configured to transmit the first command before the second command, when the first number is greater than the second number.

5. The memory system according to claim 1, wherein the memory controller is configured to, when the random read process is being executed, determine which of the first command or the second command is to be transmitted first, further based on a result of comparing a first order in which commands associated with the second plane are queued and a second order in which commands associated with the third plane are queued.

6. The memory system according to claim 5, wherein the memory controller is configured to transmit the first command before the second command, when the first order precedes the second order.

7. A method of controlling a nonvolatile memory that includes first, second, and third planes each including a plurality of memory cells, the method comprising:
transmitting commands to the first, second, and third planes via a first signal line;
receiving data from the first, second, and third planes via a second signal line,
determining that the first plane is executing a first process;
in response to determining that the first plane is executing the first process, suspending transmission of a first command instructing reservation of the first process to the second plane until a first condition is satisfied and suspending transmission of a second command instructing reservation of the first process to the third plane until the first condition is satisfied;
determining that a random read process is being executed; and
in response to determining that the random read process is being executed, determining which of the first command or the second command is to be transmitted first, based on a result of comparing a first number of queued commands associated with the second plane and a second number of queued commands associated with the third plane.

8. The method according to claim 7, wherein the first process includes a process of transmitting data read from the nonvolatile memory to a memory controller.

9. The method according to claim 7, wherein the first condition includes a difference between a first time and a second time being equal to or less than a threshold, wherein the first time is when the first process being executed by the first plane is completed, and, when the transmission of the first command is started from a current time, the second time is when the transmission of the first command is completed.

10. The method according to claim 7, wherein the first command is transmitted before the second command, when the first number is greater than the second number.

11. The method according to claim 7, wherein which of the first command or the second command is to be transmitted first is determined, further based on a result of comparing a first order in which commands associated with the second plane are queued and a second order in which commands associated with the third plane are queued.

12. The method according to claim 11, wherein the first command is transmitted before the second command, when the first order precedes the second order.

13. A memory controller configured to control a nonvolatile memory that includes first, second, and third planes each including a plurality of memory cells, the memory controller comprising circuitry configured to:
transmit commands to the first, second, and third planes via a first signal line;
receive data from the first, second, and third planes via a second signal line;
when the first plane is executing a first process, suspend transmission of a first command instructing reservation of the first process to the second plane until a first condition is satisfied and suspend transmission of a second command instructing reservation of the first process to the third plane until the first condition is satisfied; and
when a random read process is being executed, determine which of the first command or the second command is to be transmitted first, based on a result of comparing a first number of queued commands associated with the second plane and a second number of queued commands associated with the third plane.

14. The memory controller according to claim 13, wherein the first process includes a process of transmitting data read from the nonvolatile memory to the circuitry.

15. The memory controller according to claim 13, wherein the first condition includes a difference between a first time and a second time being equal to or less than a threshold, wherein the first time is when the first process being executed by the first plane is completed, and, when the transmission of the first command is started from a current time, the second time is when the transmission of the first command is completed.

16. The memory controller according to claim 13, wherein the circuitry is configured to transmit the first command before the second command, when the first number is greater than the second number.

17. The memory controller according to claim 13, wherein the circuitry is configured to, when the random read process is being executed, determine which of the first command or the second command is to be transmitted first, further based on a result of comparing a first order in which commands associated with the second plane are queued and a second order in which commands associated with the third plane are queued.

18. The memory controller according to claim 17, wherein the circuitry is configured to transmit the first command before the second command, when the first order precedes the second order.

* * * * *